Patented Nov. 23, 1943

2,334,761

UNITED STATES PATENT OFFICE 2,334,761

PREPARATION OF STRAIGHT CHAIN HYDROXY COMPOUNDS HAVING AT LEAST SIX CARBON ATOMS

William E. Hanford and Richard S. Schreiber, Wilmington, Del., assignors to E. I. du Pont de Nemours & Company, Wilmington, Del., a corporation of Delaware No Drawing. Application October 28, 1939, Serial No. 301,762

5 Claims. (Cl. 260—602)

This invention relates to the preparation of straight chain hydroxy compounds having at least 6 carbon atoms. More particularly it relates to the preparation of trihydroxyhexane and tetrahydroxyoctane. It also relates to the preparation of the intermediate polyhydroxy aldehydes.

Hydroxy aldehydes containing more than 6 carbon atoms have heretofore been prepared either by the self-condensation of acetaldehyde or of aldol, or by condensing acetaldehyde with aldol. No method has heretofore been known, however, either for controlling the reaction so as to produce said hydroxy aldehydes, as the major components of the reaction mixture, or for their isolation in substantially pure form. It has now been unexpectedly discovered that the reaction may be controlled at any desired degree of condensation by converting the resulting polyhydroxy aldehydes to the corresponding polyhydroxy alcohols by catalytic hydrogenation. The resulting alcohols may then be isolated from the reaction mixture and separated from one another either by vacuum fractional distillation or by any other means known to the art.

This invention has as an object the provision of a new and simple process for the production of straight chain hydroxy compounds having at least 6 carbon atoms. Another object is the preparation of trihydroxy hexane and tetrahydroxy octane. Still another object is the production of polyhydroxy aldehydes having at least 6 carbon atoms. Another object is to provide a method of hydrogenating hydroxy aldehydes to the corresponding hydroxy derivatives having one more primary hydroxy group than the parent aldehydes. Another object is to provide new chemical compounds. Other objects will be apparent from a reading of the following description of the invention.

These objects may be accomplished by a process involving one or more of the following steps. An aldol is condensed with acetaldehyde or with itself in the presence of an alkaline catalyst and the primary product obtained is catalytically hydrogenated so as to convert the aldehyde group to a primary hydroxy group. The polyhydroxy compounds obtained in the condensation step have hydroxy groups on alternate carbon atoms with an aldehyde group on one of the terminal carbon atoms. A preferred embodiment of this process comprises carrying out the condensation of aldol with itself in such a manner that high yields of a trihydroxyoctanal are produced, and catalytically hydrogenating this aldehyde to the corresponding tetrahydroxyoctane.

The following examples set forth certain well defined instances of the application of this invention. They are, however, not to be considered as limitations thereof since many modifications may be made without departing from the spirit and scope of this invention.

Example I

Eleven hundred fifty grams of paraldol were dissolved in 1 liter of water, and to this mixture were added 63 grams of barium hydroxide octahydrate $(Ba(OH)_2 \cdot 8H_2O)$ dissolved in 250 cc. of warm water. After agitating the solution vigorously for 2 hours, the total aldehyde content had dropped to approximately one-fourth of the original value. The temperature rose from 20° C. to 40° C. during this period. At this point, further reaction was prevented by neutralizing the solution with sulfuric acid. The resulting yellow, viscous solution was then catalytically hydrogenated at 80° to 150° C., using 100 grams of nickel-on-kieselguhr catalyst and a pressure of 2,000 to 3,000 lbs. per square inch. After filtering off the catalyst, the hydrogenated material was extracted with ether and then distilled under reduced pressure to yield the following results:

| Fraction | Grams | Boiling point, °C. at 2 mm. | Substance |
|---|---|---|---|
| I | 56 | 150–160 | Trihydroxyhexane. |
| II | 510 | 200–215 | Tetrahydroxyoctane. |

The tetrahydroxyoctane obtained by this procedure is a straw-colored, viscous liquid, extremely soluble in water, somewhat hygroscopic, and insoluble in ether. This material was analyzed to give the following results: C, 54.90; H, 10.05; mol. wt., 191; hydroxyl number, 1175.

The trihydroxyhexane is also a straw-colored but not quite as viscous a liquid, extremely soluble in water, and insoluble in ether. Analysis of this fraction gave the following results: C, 53.90; H, 10.80; mol. wt., 118; hydroxyl number, 1077.

Example II

One hundred thirty-two grams of paraldol were partially dissolved in 150 cc. of water, and then 25 cc. of a 50% solution of sodium hydroxide was added very slowly. The solution of the paraldol caused the temperature to drop to approximately 3° C. for a very short interval, and then it rose rapidly to approximately 25–35° C. After one hour at this temperature, 25 cc. more of 50% sodium hydroxide were added, and the reaction allowed to run for an additional 2 hours. At the end of this time, the reaction was stopped by the addition of dilute sulfuric acid of which sufficient was added to lower the pH from 9.3 to 5.5. Approximately one-third of this sample was then hydrogenated catalytically at 80–150° C. with 10 g. of nickel-on-kieselguhr catalyst at a pressure of 2,000 to 3,000 lbs. per square inch. After filtering the catalyst and distilling under reduced pressure, the following results were obtained:

| Fraction | Grams | Boiling point, °C. | Pressure in mm. | Substance |
|---|---|---|---|---|
| I | 30.8 | 100–110 | 8 | Butylene glycol. |
| II | 2.3 | 110–150 | 3 | |
| III | 3.0 | 150–160 | 3 | Trihydroxyhexane. |
| IV | 26.1 | 200–210 | 3 | Tetrahydroxyoctane. |

Analysis of Fractions III and IV gave results similar to those described in Example I.

Example III

Five hundred grams of crude aldol were treated with 50 cc. of water containing 10 g. of barium hydroxide hydrate (Ba(OH)$_2$.8H$_2$O). The addition of this alkali raised the pH from 6.8 to 9.7. After 18 hours, during which time the temperature was held at 30–33° C., the total aldehyde content had dropped to approximately one-half the original value. At this point, sufficient sulfuric acid was added to lower the pH to 6.5, and then one-half of this mixture was hydrogenated similarly to that described in Example I. Distillation of the hydrogenated product yielded the following results:

| Fraction | Grams | Boiling point, °C. | Pressure in mm. | Substance |
|---|---|---|---|---|
| I | 69.0 | 105–110 | 8 | Butylene glycol. |
| II | 32.5 | 150–160 | 2 | Trihydroxyhexane. |
| III | 27.5 | 200–215 | 2 | Tetrahydroxyoctane. |

Analysis of Fractions II and III gave results similar to those described in Example I.

Example IV

Three hundred grams of paraldol were dissolved in 300 g. of water by adding 3 cc. of dilute 10% sodium hydroxide and warming to 40° C. At this point, 20 g. of magnesium oxide were added, and the solution vigorously agitated for 24 hours while maintaining a temperature of 40° C. At the end of this time, the total aldehyde content had dropped to approximately one-third of the original value. After filtering to remove the unchanged catalyst, the solution was neutralized by adding dilute sulfuric acid and then approximately one-third was hydrogenated in the manner described in Example I, using 15 g. of nickel-on-kieselguhr catalyst. After separating the oily layer which amounted to approximately 33 g., the residue was distilled under reduced pressure to yield the following results:

| Fraction | Grams | Boiling point, °C. at 2 mm. | Substance |
|---|---|---|---|
| I | 7.5 | 85–100 | Butylene glycol. |
| II | 4.2 | 100–135 | |
| III | 13.1 | 150–160 | Trihydrohexane. |
| IV | 14.0 | 200–210 | Tetrahydroxyoctane. |

Analysis of Fractions III and IV gave results similar to those obtained for the corresponding compounds in Example I.

Example V

One hundred grams of paraldol were partially dissolved in 100 cc. of dioxane. To this slurry were added 2 g. of powdered calcium oxide, but as no appreciable increase in the pH of the solution was observed, 16 cc. of 10% sodium hydroxide were added. The addition of this amount of alkali raised the pH from 6.5 to 8.5. After 2½ hours at 30–35° C., during which time vigorous agitation was maintained, the total aldehyde content had dropped to one-quarter of the original value. The solution was then treated with sufficient sulfuric acid to lower the pH to 6.0, and the sample hydrogenated with 10 g. of nickel-on-kieselguhr, using conditions similar to those employed in Example I. After removal of the catalyst and dioxane the residue was distilled at 4 to 5 mm. pressure to yield the following results:

| Fraction | Grams | Boiling point, °C. | Substance |
|---|---|---|---|
| I | 6.5 | 89–100 | |
| II | 2.8 | 100–120 | |
| III | 2.7 | 120–140 | |
| IV | 4.3 | 150–160 | Trihydroxyhexane. |
| V | 18.0 | 200–215 | Tetrahydroxyoctane. |

In view of the fact that aldol tends to dissociate into 2 moles of acetaldehyde, especially in aqueous solution, there is always a tendency for some of the acetaldehyde thus produced to condense with the aldol and give rise to a dihydroxyhexanal which on hydrogenation produces the trihydroxyhexane as indicated in Examples I, II, III, IV, and V. Due to the fact that both trihydroxyhexane and tetrahydroxyoctane contain two or more asymmetric carbon atoms, several stereoisomers are to be expected which would readily account for the very wide range in the boiling point of the pure product.

It is not essential to start with paraldol or pure aldol since the crude aldol as obtained by the condensation of acetaldehyde with itself will serve equally well for this purpose. In the practice of this invention it is generally preferred to use aldol concentrations in the range of 40 to 50%, because above about 50% the rate of condensation is retarded and concentrations below about 40% are uneconomical.

Although the reaction can be carried out in water or in inert organic solvents in which aldol or paraldol is soluble, water is the preferred solvent. In place of water there may be used such organic solvents as ethanol, dioxane, butanol, methyl ether of ethylene glycol, benzyl alcohol, chloroform, etc.

Any strong alkaline catalyst will cause aldol to condense with itself to give the desired products. The preferred condensing agents are the oxides or hydroxides of the alkali or alkaline earth elements such as sodium, potassium, calcium, magnesium, and barium. Due to the fact that acidic compounds are produced in small amounts during the condensation, it is usually necessary to use at least three per cent catalyst based on the aldol employed. In actual practice amounts of catalyst ranging from 3% to 10% based on the weight of aldol should be used.

Although temperatures ranging from 0° C. up to 150° C. can be employed, it is preferable to use temperatures ranging between 25° and 75° C. in order to obtain better control during the condensation step.

In order to obtain high yields of the tetrahydroxyoctane, it is preferable to stop the reaction when the total aldehyde content has dropped to approximately two-thirds or three-quarters of the original value. Although the reaction can be stopped almost completely by cooling the mixture to temperatures below 0° C., it is preferred to treat the mixture with an inorganic or organic acid until the pH has been lowered to a value in the range of 5.0 to 6.5.

For hydrogenating the condensation products any of the common hydrogenation catalysts can be used, but it is generally preferred to use a ferrous metal catalyst such as metallic nickel or cobalt either in a massive form or supported on such materials as kieselguhr or silica gel. The amount of catalyst required ranges from 1 to 10% based on the aldol employed. In general the quantity of catalyst and conditions of hydrogenation are largely dependent on the type of catalyst used. In place of the ferrous metal catalysts there may be used mild acting hydrogenation catalysts such as silver, tin, cadmium, copper, etc., their oxides and chromites, and the oxides and chromites of manganese, iron, nickel, cobalt, etc. In the hydrogenation step temperatures in the range of 25° C. to 200° C. may be used. It is preferred, however, to carry out the hydrogenation at temperatures in the range of 50° C. to 150° C. Hydrogen pressures limited only by the bursting strength of the reaction vessel used may be employed. It is generally preferred to employ pressures ranging from 1000 to 4000 lbs./sq. in.

The polyhydric alcohols of this invention are useful as glycerine substitutes, especially as plasticizers and ingredients for the preparation of polyhydric alcohol-polycarboxylic acid resins. By this process new types of polyhydric alcohols can be readily obtained from inexpensive raw materials.

It is apparent that many widely different embodiments of this invention may be made without departing from the spirit and scope thereof and therefore it is not intended to be limited except as indicated in the appended claims.

We claim:

1. The process for the production of water-soluble trihydric and higher polyhydric alcohols which comprises condensing aldol with a member selected from the class consisting of aldol and acetaldehyde in the presence of an alkaline catalyst, in an aqueous medium at a temperature between 0° C. and 150° C., and maintaining said condensation reaction until approximately one-half to three-fourths of the total aldehyde has been condensed, then stopping the condensation reaction, thereby obtaining a mixture of water-soluble straight-chain polyhydroxy aldehydes of at least 6 carbon atoms having an aldehyde group on a terminal carbon atom and having a hydroxy group on alternate carbon atoms, bringing the resulting mixture into contact with a hydrogenation catalyst while in admixture with hydrogen at a temperature within the range of 25° to 200° C., thereby hydrogenating said straight-chain polyhydroxy aldehydes to the corresponding alcohols.

2. The process in accordance with claim 1 characterized in that the catalytic hydrogenation reaction is carried out at a temperature within the range of 50° to 150° C. while using a hydrogenation catalyst selected from the group consisting of nickel and cobalt hydrogenation catalysts.

3. A process for the production of water-soluble trihydric and higher polyhydric alcohols which comprises condensing aldol with a member selected from the class consisting of aldol and acetaldehyde in the presence of an alkaline catalyst, in an aqueous medium, at a temperature between 25° C. and 75° C., and maintaining said condensation reaction until approximately one-half to three-fourths of the total aldehyde has been condensed thereby obtaining a mixture of water-soluble straight chain polyhydroxy aldehydes of at least 6 carbon atoms having an aldehyde group on a terminal carbon atom and having hydroxyl groups on alternate carbon atoms, adding an acid to said reactants in a quantity sufficient to reduce the pH of the solution to from 5.0 to 6.5, and bringing said resulting mixture into contact with a hydrogenation catalyst selected from the group consisting of nickel and cobalt hydrogenation catalysts while in admixture with hydrogen under a pressure within the range of 1000 to 4000 lbs. per sq. in. and at a temperature within the range of 50° C. to 150° C., thereby hydrogenating said straight chain polyhydroxy aldehydes to the corresponding alcohol.

4. The process in accordance with claim 3 characterized in that the aldehyde concentration in the starting material prior to condensation is within the range of 40 to 50%.

5. A process for the production of water-soluble straight chain polyhydroxy aldehydes of at least 6 carbon atoms having an aldehyde group on a terminal carbon atom and having hydroxyl groups on alternate carbon atoms which comprises condensing aldol with a member selected from the group consisting of aldol and acetaldehyde in the presence of an alkaline catalyst, in an aqueous medium, at a temperature within the range of 25° to 75° C., and stopping the reaction when approximately one-half to three-fourths of the total aldehyde has been condensed by adding thereto an acid in quantity sufficient to reduce the pH of the solution to from 5.0 to 6.5.

RICHARD S. SCHREIBER.
WILLIAM E. HANFORD.